United States Patent
Miller (10) Patent No.: US 6,522,723 B1
(45) Date of Patent: Feb. 18, 2003

(54) TELEPHONY LINE TEST UNIT AND METHOD

(75) Inventor: Gary M. Miller, Leesburg, VA (US)

(73) Assignee: Tollgrade Communications, Inc., Wilmington, DE (US)

(*) Notice: Subject to any disclaimer, the term of this patent is extended or adjusted under 35 U.S.C. 154(b) by 0 days.

(21) Appl. No.: 09/701,721

(22) PCT Filed: Jun. 9, 1999

(86) PCT No.: PCT/US99/12973
§ 371 (c)(1),
(2), (4) Date: Feb. 8, 2001

(87) PCT Pub. No.: WO99/65211
PCT Pub. Date: Dec. 16, 1999

Related U.S. Application Data (60) Provisional application No. 60/088,634, filed on Jun. 9, 1998.

(51) Int. Cl.[7] ............. H04M 1/24; H04M 3/08; H04M 3/22
(52) U.S. Cl. ............. 379/27.01; 379/29.03; 379/29.04
(58) Field of Search ............. 379/1.01, 1.04, 379/419, 10.01, 15.01, 17, 24, 22.02–22.03, 27.01, 27.03–27.04, 29.03–29.04, 29.01, 30

(56) References Cited

U.S. PATENT DOCUMENTS

| | | | |
|---|---|---|---|
| 5,054,050 A | 10/1991 | Burke et al. ............. 379/27 |
| 5,301,050 A | * 4/1994 | Czerwiec et al. | |
| 5,361,293 A | * 11/1994 | Czerwiec et al. | |
| 5,699,402 A | 12/1997 | Bauer et al. ............. 379/26 |
| 5,764,727 A | * 6/1998 | Toumani et al. | |

* cited by examiner

Primary Examiner—Duc Nguyen
(74) Attorney, Agent, or Firm—Webb Ziesenheim Logsdon Orkin & Hanson, P.C.

(57) ABSTRACT

A telephony test system (34) has a communication interface (52, 54, 56) connected to communicate with a remote terminal (16). In response to receiving an electrical test request signal from the remote terminal (16), a controller (50) causes an analog-to-digital converter (DAC) (70) to produce an analog signal which is supplied to a high voltage amplifier (124) which amplifies and supplies the amplified analog signal to customer telephony equipment (6). Controller (50) measures the response of customer telephony equipment (6) to the amplified analog signal and determines from the response and the amplified analog signal an electrical power dissipated by the high voltage amplifier during supply of the amplified analog signal. Controller (50) controls a power supply to adjust the voltage supplied to the high voltage amplifier (124) to avoid electrical power dissipated thereby during supply of the amplified analog signal from exceeding a desired maximum electrical power dissipation.

19 Claims, 5 Drawing Sheets

TELEPHONY LINE TEST UNIT AND METHOD

This application claims the benefit of Provisional application Ser. No. 60/088,634, filed Jun. 9, 1998.

BACKGROUND OF THE INVENTION

1. Field of the Invention

The present invention relates to a telephone line tester and, more particularly, to a telephone line tester which can be positioned close to customer telephony equipment and communicate test results to a test controller positioned remote from the customer telephony equipment.

2. Background Art

Heretofore, customer telephony equipment was connected to a switch via copper wire pairs. The switch enabled telephony equipment of one customer to be connected to telephony equipment of another customer connected to the same switch or to another switch connected thereto. In order to test the customer telephony equipment, test equipment connected to the switch was connected thereby to a select one of the customer telephony equipment. Selectively connecting the customer telephony equipment thereto enabled the test equipment to test the customer telephony equipment for proper operation.

The inherent resistance of the copper wire pairs utilized to connect customer telephony equipment to the switch limited the effective distance of the connection between each customer telephony equipment and the switch. This limitation required numerous interconnected switches to be distributed throughout a service area to provide telephony service to customer telephony equipment in the service area.

To increase the distance between the switch and each customer telephony equipment, a digital loop carrier system can be positioned between the switch and the customer telephony equipment. The digital loop carrier system enhances the service area of each switch by providing a digital communication network for carrying telephony signals digitally over a significant portion of the path, for example, via a fiber optic cable, between the switch and one or more customer telephony equipment. The digital loop carrier system converts electrical signals transmitted on each copper wire pair into optical signals that can be transmitted over longer distances than the inherent resistance of each copper wire pair would permit. Customer telephony equipment positioned close to the switch can be connected directly thereto.

A problem with the digital loop carrier system is that it is necessary to connect a copper bypass pair in parallel with the fiber optic cable to facilitate testing of the customer telephony equipment. One end of this copper bypass pair is connected to a pair gain test controller which is connected between the test equipment and the switch. The other end of the copper bypass pair is connected to an end of the digital loop carrier system opposite the switch for connection to customer telephony equipment. The pair gain test controller enables the test equipment to be selectively connected to customer telephony equipment connected to the end of the digital loop carrier system opposite the switch via the copper bypass pair or to customer telephony equipment connected directly to the switch via a copper wire pair. Problems with the copper bypass pair running parallel to the fiber optic cable include the susceptibility of the copper bypass pair to corrosion and breaking over time, variances in resistance of the copper bypass pair due to changes in temperature, the need for the test equipment to compensate for the increased distance between the test equipment and the customer telephony equipment and reduced testing accuracy due to electrical impairments occasioned by the copper bypass pair.

It is, therefore, an object of the present invention to provide a low cost and flexible telephone line tester which can be positioned at an end of a digital loop carrier system adjacent customer telephony equipment and which can be utilized to test the customer telephony equipment in a manner similar to test equipment heretofore positioned adjacent the switch side of the digital loop carrier system. It is an object of the present invention to avoid the use of a copper bypass pair in parallel with a fiber optic cable in order to test customer telephony equipment. Still other objects of the present invention will become apparent to those of ordinary skill in the art upon reading and understanding the following detailed description.

SUMMARY OF THE INVENTION

Accordingly, I have invented a telephony test system for testing customer telephony equipment. The telephony test system includes a test control computer configured to supply an electrical test request signal and to receive an electrical test result signal. A central office terminal is connected between the test control computer and a fiber optic cable. The central office terminal is configured to receive the electrical test request signal from the test control computer, to convert the electrical test request signal to a corresponding optical test request signal and to supply the optical test request signal to the fiber optic cable. The central office terminal also receives an optical test result signal from the fiber optic cable, converts the optical test result signal to the electrical test result signal and supplies the electrical test result signal to the test control computer. A remote terminal is connected between an end of the fiber optic cable opposite the central office terminal and telephony equipment of a plurality of customers. The remote terminal is configured to receive the optical test request signal from the fiber optic cable and to convert the optical test request signal to the electrical test request signal. The remote terminal also receives the electrical test result signal, converts the electrical test result signal to the optical test result signal and supplies the optical test result signal to the fiber optic cable. A line test unit (LTU) has a controller between the remote terminal and a high voltage amplifier configured to be connected by the remote terminal to select customer telephony equipment to supply a test signal thereto. The LTU includes a power supply configured to be controlled by the controller to supply electrical power to the high voltage amplifier. The controller causes the high voltage amplifier to supply a test signal to the customer telephony equipment. The controller determines electrical power dissipated by the high voltage amplifier supplying the test signal to the customer telephony equipment and controls the power supply to adjust the voltage supplied to the high voltage amplifier to avoid electrical power dissipated by the high voltage amplifier from exceeding a desired maximum electrical power dissipation.

The power supply can supply to the high voltage amplifier a differential voltage having a maximum value of ±190 volts. The controller can include a digital signal processor (DSP) operating under control of a software program and a logic circuit controlled by the DSP, with the logic circuit or the DSP implementing a communication interface which receives the electrical test request signal from the remote terminal and which supplies the electrical test result signal to the remote terminal.

The LTU can include a digital-to-analog converter (DAC) to receive digital signals from the controller and to produce an analog signal as a function of the received digital signals. A successive approximation network can be connected to receive the analog signal from the DAC, to compare the analog signal received from the DAC with a measured electrical condition of the customer telephony equipment and to provide to the controller a binary signal indicative of the comparison. A receive channel filter can filter the measured electrical condition and supply the filtered and measured electrical condition to the successive approximation network for comparison. A sample-and-hold switch network can receive the measured electrical condition and supply the measured electrical condition to the successive approximation network for comparison. The controller connects the successive approximation network to selectively receive the filtered and measured electrical condition from the receive channel filter and the measured electrical condition from the sample-and-hold switch network.

The LTU can include a transmit channel filter which receives and filters the analog signal from the DAC and supplies the filtered analog signal to the high voltage amplifier. A transmit/receive (T/R) switch network can selectively connect (i) the transmit channel filter to receive the analog signal from the DAC or (ii) the successive approximation network to receive the filtered and measured electrical condition from the received channel filter. A voiceband transceiver can be connected to receive a digital signal from the controller, to supply to the high voltage amplifier a voiceband signal corresponding to the received digital signal, to receive a voiceband signal from the customer telephony equipment and to convert the received voiceband signal into a digital signal for processing by the controller. An input/output (I/O) switch network can connect the high voltage amplifier to selectively receive (i) the voiceband signal from the voiceband transceiver and the analog signal from the DAC or (ii) the analog signal from the DAC.

The LTU can include a tip terminal and a ring terminal configured to be connected by the remote terminal to a tip circuit and a ring circuit of the customer telephony equipment. A tip I/O signal path and a ring I/O signal path can be connected between the sample-and-hold switch network and the tip terminal and the ring terminal to convey the measured electrical condition of the select customer telephony equipment therefrom to the sample-and-hold switch network. A tip-out (TO) signal path and a ring-out (RO) signal path can be connected to selectively receive the analog signal from the DAC. The TO signal path and the RO signal path include the transmit channel filter. A tip high voltage amplifier can be connected between the TO signal path and the tip terminal and a ring high voltage amplifier can be connected between the RO signal path and the ring terminal. The tip high voltage amplifier and the ring high voltage amplifier comprise the high voltage amplifier. A tip-in (TI) signal path can be connected between the tip terminal and the successive approximation network and a ring-in (RI) signal path can be connected between the ring terminal and the successive approximation network. The TI signal path and the RI signal path include the receive channel filter. A voiceband tip path and a voiceband ring path can be connected between the voiceband transceiver and the TI signal path and the RI signal path, respectively. A tip I/O switch network can be connected between the TO signal path, the voiceband tip path and the tip high voltage amplifier and a ring I/O switch network can be connected between the RO signal path, the voiceband ring path and the ring high voltage amplifier. The tip I/O switch network and the ring I/O switch network comprise the I/O switch network. The tip I/O switch network selectively connects the tip high voltage amplifier to (i) the combination voiceband tip path and TO signal path or (ii) the TO signal path. The ring I/O switch network selectively connects the ring high voltage amplifier to (i) the voiceband ring path and the RO signal path or (ii) the RO signal path.

The controller can control the sample-and-hold switch network and the T/R switch network to selectively connect the successive approximation network to the TO signal path, the RO signal path, the TI signal path, the RI signal path, the tip I/O signal path and the ring I/O signal path.

I have also invented a telephony line test unit having a communication interface connected to communicate with a remote terminal which is connected to communicate with a central office terminal via a digital communication network. The line test unit includes an input/output which is selectively connectable by the remote terminal to customer telephony equipment. A controller receives an electrical test request signal from the remote terminal and a digital-to-analog converter (DAC) controlled by the controller produces an analog signal. A comparator has a first input connected to receive the analog signal from the DAC, a second input connected to receive an analog signal from the input/output of the line test unit and an output which supplies a binary signal to the controller which corresponds to the comparison of the analog signals received at the first and second inputs. A high voltage amplifier selectively receives the analog signal from the DAC and supplies an electrical test signal to the input/output of the line test unit as a function of the analog signal received thereby. An adjustable power supply controlled by the controller supplies to the high voltage amplifier electrical power at a desired potential. In response to receiving the electrical test request signal, the controller causes the high voltage amplifier to supply the electrical test signal to the customer telephony equipment. The controller, the DAC and the comparator coact to determine the response of the customer telephony equipment to the electrical test signal. The controller determines as a function of the supplied test signal and the response of the customer telephony equipment thereto electrical power dissipated by the high voltage amplifier and controls the power supply to adjust the potential of the electrical power supplied to the high voltage amplifier to avoid electrical power dissipated by the high voltage amplifier from exceeding a desired maximum electrical power dissipation.

The line test unit can include a receive channel filter to receive the electrical test signal from the input/output of the line test unit, to filter the received electrical test signal and to supply the filtered electrical test signal to the second input of the comparator. A switch network can connect the second input of the comparator to selectively receive the electrical test signal from the input/output of the test system or the filtered electrical test signal from the receive channel filter. A transmit channel filter can be connected to receive the analog signal from the DAC, to filter the received analog signal and to supply the filtered analog signal to the high voltage amplifier. A voiceband transceiver can be connected to supply a voiceband signal to the high voltage amplifier and to receive a voiceband signal from the input/output of the line test unit. The switch network can connect the high voltage amplifier to selectively receive (i) the voiceband signal from the voiceband transceiver and the analog signal from the DAC or (ii) the analog signal from the DAC.

I have also invented a method of testing customer telephony equipment connected to a switching network with a test system disposed at the switching network. The method includes receiving a test request signal at the test system and the switching network. In response to the switching network receiving the test request signal, an input/output of the test system is connected to the customer telephony equipment. In response to the test system receiving the test request signal and the switching network connecting the input/output of the test system to the customer telephony equipment, a high voltage amplifier of the test system is caused to supply a test voltage to the customer telephony equipment via the input/output of the test system. The electrical power dissipated by the high voltage amplifier is determined during supply of the test voltage thereby. A power supply is controlled to adjust a voltage supplied to the high voltage amplifier to avoid electrical power dissipated during supply of the test voltage thereby from exceeding a desired maximum electrical power dissipation.

The method can also include the steps of measuring with the test system via the input/output thereof a response of the customer telephony equipment to the test voltage and transmitting from the test system a test result signal related to the measured response of the customer telephony equipment.

Lastly, I have invented a test system disposed at a switching network for testing telephony equipment of a plurality of customers connected to the switching network. The test system includes receiver means for receiving a test request signal via the switching network. Measurement means measures electrical conditions of the telephony equipment of one of the plurality of customers and high voltage amplifier means supplies a test voltage to the telephony equipment of the one customer. Control means controls the high voltage amplifier means to supply the test voltage to the telephony equipment of the one customer and controls the measurement means to measure an electrical condition of the telephony equipment of the one customer in response to the test voltage. Power supply means controlled by the control means supplies electrical power to the high voltage amplifier means. Transmitting means transmits a test result signal related to the measured electrical condition of the telephony equipment of the one customer. The control means determines electrical power dissipated by the high voltage amplifier means supplying the test voltage to the telephony equipment of the one customer and controls the power supply means to adjust the voltage supplied to the high voltage amplifier to avoid electrical power dissipated thereby from exceeding a desired maximum electrical power dissipation.

DETAILED DESCRIPTION OF THE PREFERRED EMBODIMENTS

Before describing the present invention, the prior art will be described in connection with FIGS. 1 and 2, where like reference numbers correspond to like elements.

Figure 1:
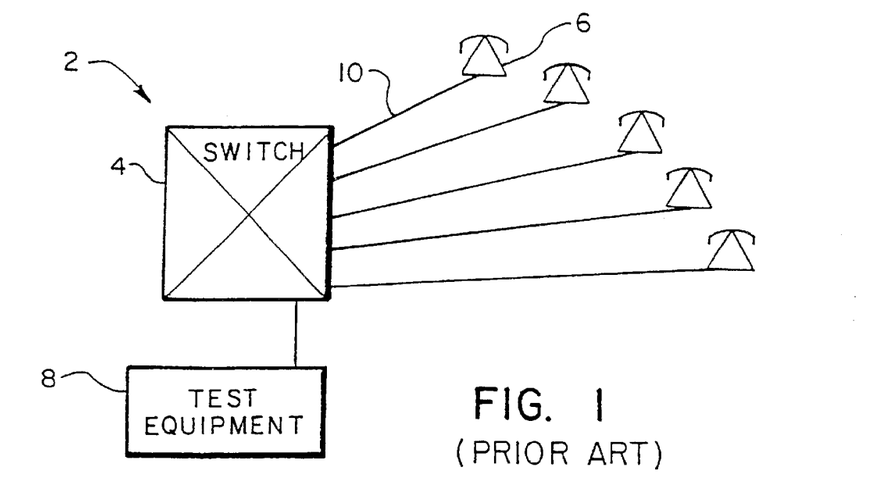
FIG. 1 is a schematic drawing of a prior art telephone system.

Referring to FIG. 1, a prior art telephone system 2 includes a switch 4 which is utilized to make connections between customer telephony equipment 6 connected to switch 4 or between customer telephony equipment 6 connected to switch 4 and customer telephony equipment (not shown) connected to another switch (not shown) which is interconnected with switch 4. Test equipment 8 is connected to switch 4 for testing each customer telephony equipment 6. To test a select customer telephony equipment 6, test equipment 8 signals switch 4 to connect the select customer telephony equipment 6 to test equipment 8. When test equipment 8 completes testing the select customer telephony equipment 6, test equipment 8 causes switch 4 to isolate test equipment 8 from the select customer telephony equipment 6 and to connect test equipment 8 to another customer telephony equipment 6 for testing thereof. In this manner, test equipment 8 can test each customer telephony equipment 6 connected to switch 4.

The prior art telephone system 2 utilizes copper wires 10 to connect customer telephony equipment 6 to the switch 4. The inherent resistance of the copper wire 10 limits the effective distance of the connection between customer telephony equipment 6 and switch 4. This limitation requires numerous interconnected switches 4 to be distributed throughout a service area to provide telephony services to customer telephony equipment 6 in the service area.

Figure 2:
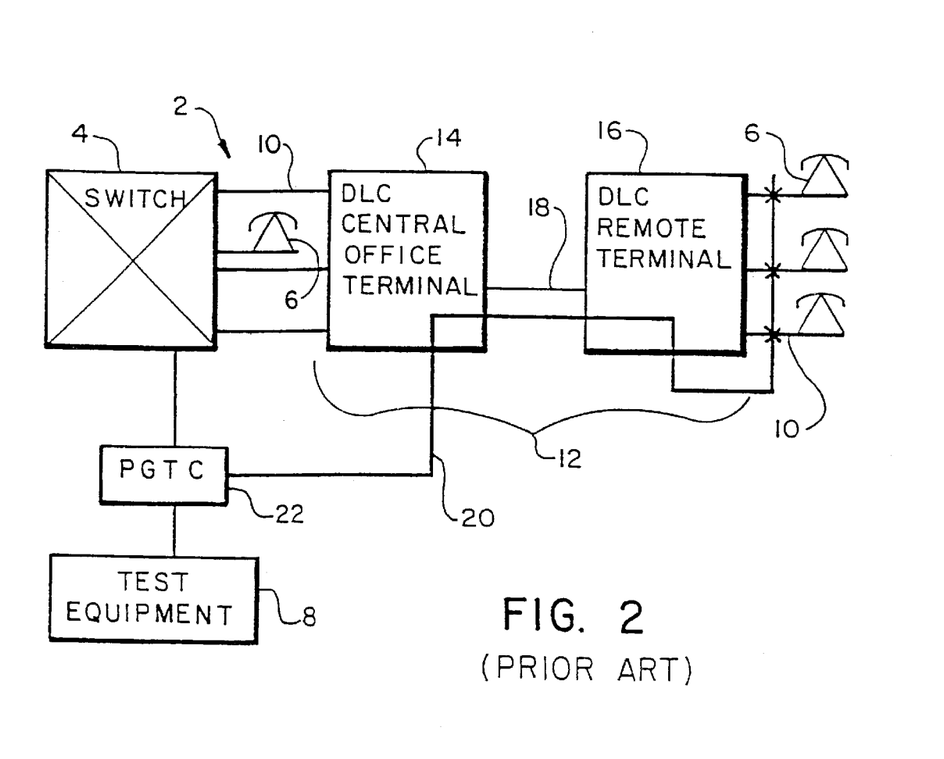
FIG. 2 is a schematic drawing of another prior art telephone system.

With reference to FIG. 2, and with continuing reference to FIG. 1, to increase the service area serviced by switch 4, a digital loop carrier (DLC) 12 is connected between switch 4 and customer telephony equipment 6. DLC 12 reduces the need to have switches 4 located near customer telephony equipment 6 thereby reducing the number of interconnected switches 4 needed to service a service area. DLC 12 includes a DLC central office terminal 14 connected in close proximity to switch 4 by copper wire 10. DLC 12 also includes a DLC remote terminal 16 connected to customer telephony equipment 6 via copper wire 10. DLC central office terminal 14 and DLC remote terminal 16 are connected by a digital network, such as fiber optic cable 18. Communication between switch 4 and DLC central office terminal 14 occurs via analog telephone signals. Similarly, communication between DLC remote terminal 16 and customer telephony equipment 6 occurs via analog telephone signals. In contrast, communication between DLC central office terminal 14 and DLC remote terminal 16 occurs via digital signals, preferably optical signals, transmitted on fiber optic cable 18.

For performance and cost considerations, voice channels of DLC 12 were designed incompatible with the voltages and currents produced by test equipment 8. Hence, as shown in FIG. 2, DLC 12 includes a copper bypass pair 20 between test equipment 8 and customer telephony equipment 6. A pair gain test controller (PGTC) 22 is connected between switch 4, test equipment 8 and an end of copper bypass pair 20 adjacent test equipment 8. PGTC 22 provides extra analog ports for selectively connecting test equipment 8 to the switch 4 or copper bypass pair 20. Problems with the embodiment shown in FIG. 2 include the susceptibility of the copper bypass pair 20 to corrosion and breaking over time, variances in the resistance of the copper bypass pair 20 due to changes in temperature and the need to improve the test equipment 8 to compensate for the increased distance between test equipment 8 and customer telephony equipment 6.

The present invention will now be described with reference to FIGS. 3–6. For simplicity of description, elements in FIGS. 3–6 which are also found in FIGS. 1–2 will be indicated by like reference numbers.

Figure 3:
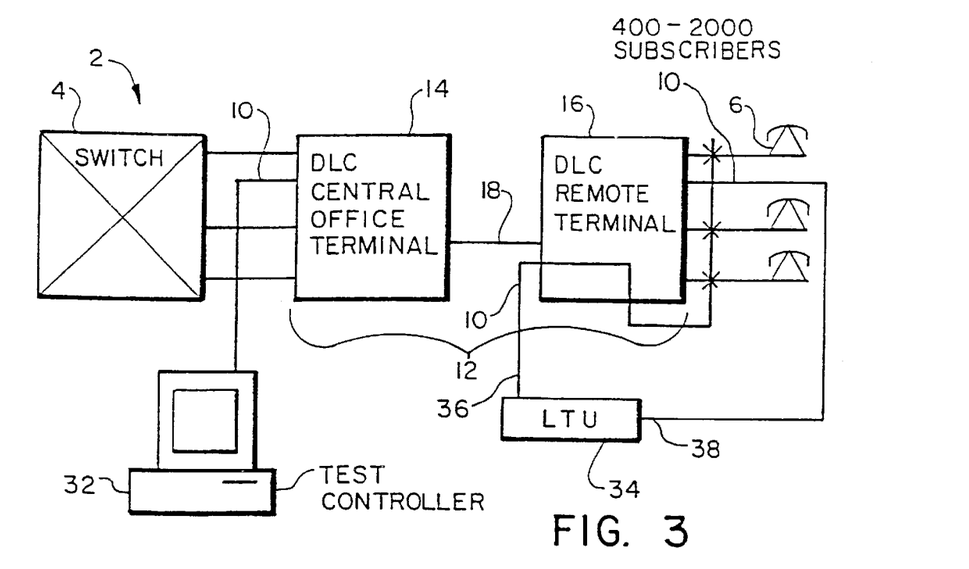
FIG. 3 is a schematic drawing of a telephone system, including a line test unit, in accordance with one embodiment of the present invention.

Referring to FIG. 3, and with continuing reference to FIG. 2, test equipment 8 and PGTC 22 are replaced by a test controller 32 which is connected via copper wire 10 to a voice channel of DLC central office terminal 14. A line test unit (LTU) 34 is connected on or adjacent DLC remote terminal 16. LTU 34 has a communication input/output (I/O) 38 connected via copper wire 10 to communication hardware (not shown) installed in a voice channel of DLC remote terminal 16.. The communication hardware converts telephony signals received thereby into RS 232 format serial data signals for receipt by communication I/O 38 of LTU 34. Similarly, the communication hardware converts RS 232 signals received from communication I/O 38 of LTU 34 into telephony signals. DLC central office terminal 14 and DLC remote terminal 16 convert telephony signals received from copper wire pairs 10 into optical signals transmitted therebetween via fiber optic cable 18. Similarly, DLC central office terminal 14 and DLC remote terminal 16 convert optical signals received from fiber optic cable 18 into telephony signals which are supplied to copper wire pairs 10 connected thereto.

LTU 34 has an I/O 36 connected to DLC remote terminal 16 via a copper wire pair 10 in the same manner as copper bypass pair 20. DLC remote terminal 16 is configured to connect I/O 36 of LTU 34 to select customer telephony equipment 6 in response to receiving test request signals from test controller 32 via DLC central office terminal 14 and fiber optic cable 18. Similarly, LTU 34 supplies test result signals to test controller 32 via DLC remote terminal 16, fiber optic cable 18 and DLC central office terminal 14.

Figure 4:
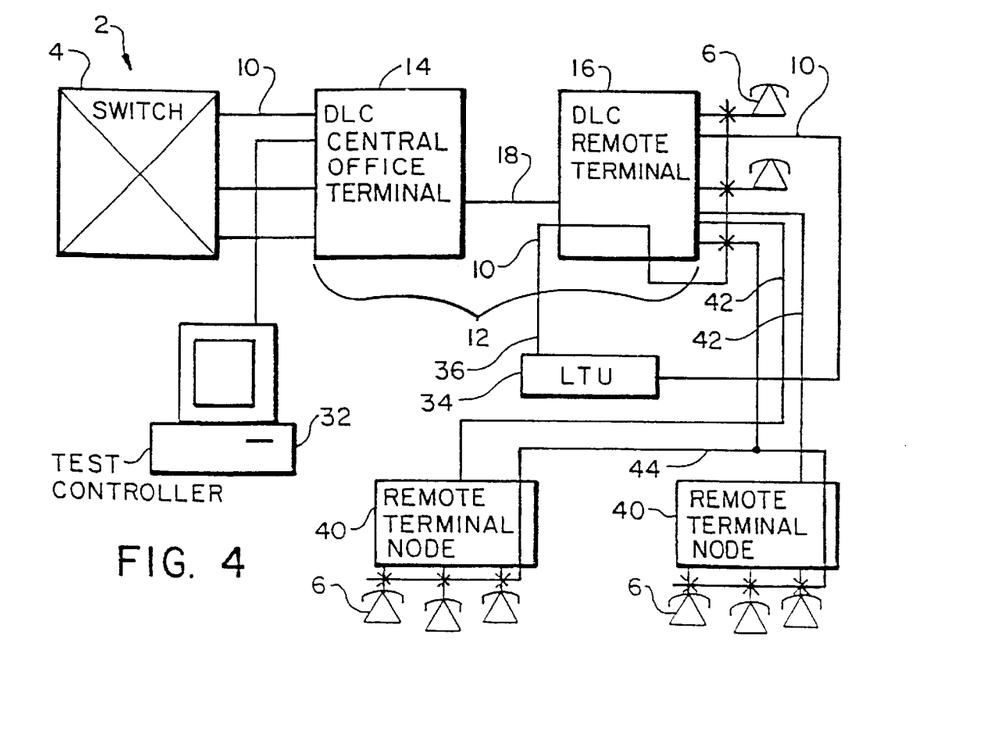
FIG. 4 is a schematic drawing of a telephone system in accordance with another embodiment of the present invention including the line test unit shown in FIG. 3.

Referring to FIG. 4, and with continuing reference to FIG. 3, the telephone system 2 can include one or more remote terminal nodes 40 each connected to DLC remote terminal 16 via a digital network, such as a fiber optic cable 42. Each remote terminal node 40 is also connected to DLC remote terminal 16 via a copper bypass pair 44 which is connected to a voice channel of DLC remote terminal 16. In response to receiving an appropriate optical test request signal via a corresponding fiber optic cable 42, each remote terminal node 40 connects one of the customer telephony equipment 6 connected thereto to I/O 36 of LTU 34 via copper bypass pair 44.

In operation of the telephone test system 2 shown in FIG. 4, in response to receiving an optical test request signal on fiber optic cable 18, DLC remote terminal 16 relays or passes the optical test request signal to each fiber optic cable 42. The optical test request signal causes DLC remote terminal 16 or one of the remote terminal nodes 40 to connect a select customer telephony equipment 6 to I/O 36 of LTU 34 for testing thereby. DLC remote terminal 16 and each remote terminal node 40 are configured so that the optical test request signal causes one select customer telephony equipment 6 at a time to be connected to I/O 36 of LTU 34. The telephone system 2 shown in FIG. 4 is particularly useful for extending existing telephony service and testing capability to new customer telephony equipment 6.

Figure 5A:
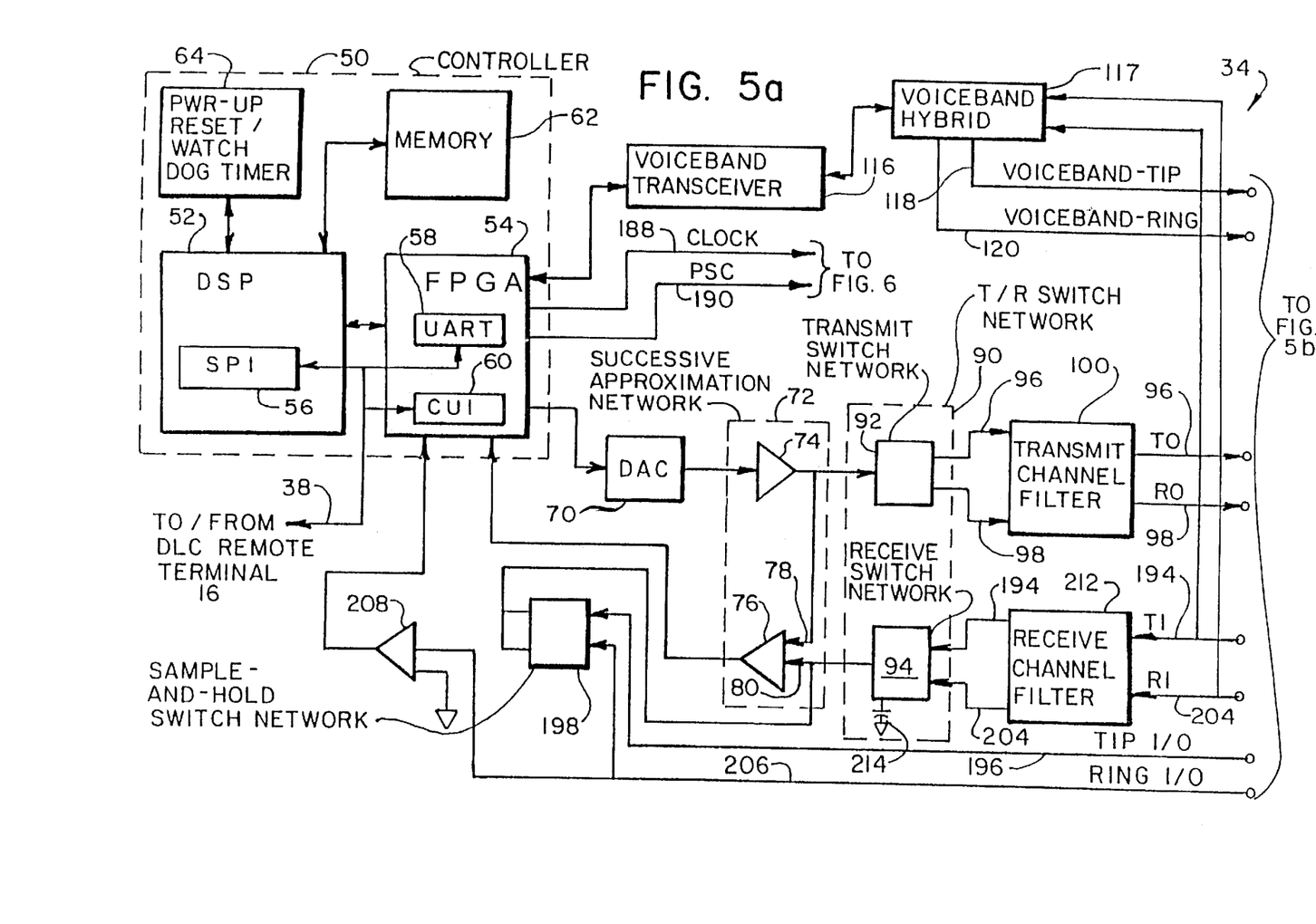
FIGS. 5a–5b are detailed schematic drawings of the line test unit shown in FIGS. 3 and 4.
Figure 5B:
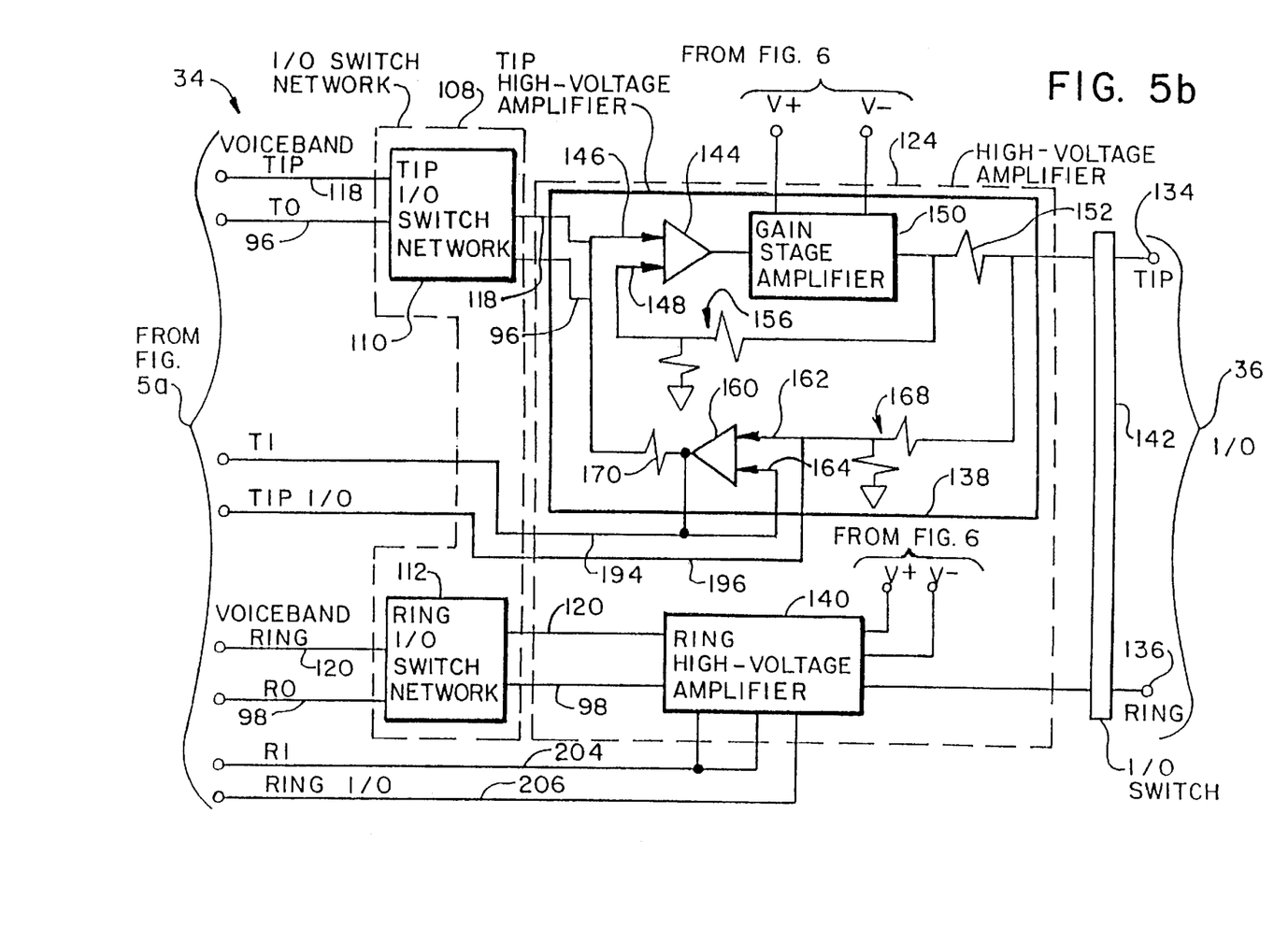

With reference to FIGS. 5a–5b, and with continuing reference to FIGS. 3 and 4, LTU 34 includes a controller 50 having a digital signal processor (DSP) 52 and logic circuit, preferably a field programmable gate array (FPGA) 54. DSP 52 and/or FPGA 54 implement a communication interface which is connected to DLC remote terminal 16 for communication therewith. Preferably, DSP 52 implements a synchronous peripheral interface (SPI) 56 and FPGA 54 implements a universal asynchronous receiver/transmitter (UART) 58 and/or a channel unit interface (CUI) 60 for communication with like interfaces implemented by DLC remote terminal 16. However, other communication interfaces can be used. Each voice channel of DLC remote terminal 16 can transmit and receive data at 64 KBPS. To enable LTU 34 to interface with a voice channel of DLC remote terminal 16, SPI 56 is configured to transmit data to and receive data from a voice channel of DLC remote terminal 16 at 64 KBPS. Alternatively, DLC remote terminal 16 is configured so that only a portion of the bandwidth of the voice channel is available to LTU 34. In this alternative, UART 58 or CUI 60 is connected to the 64 KBPS channel of DLC remote terminal 16 via the communication hardware installed in a voice channel of the DLC remote terminal 16. Typically, only one of SPI 56, UART 58 and CUI 60 is connected to DLC remote terminal 16 for communication therewith and each of SPI 56, UART 58 and CUI 60 communicate utilizing the same command structure. The LTU 34 can also interface to a standard telephone interface by including a modem between the UART 58 and the voice channel DLC remote terminal 16.

DSP 52 operates under the control of a software program stored in a memory 62. Controller 50 includes a power-up reset/watch dog timer circuit 64 which resets DSP 52 on power-up and which resets DSP 52 if power-up reset/watch dog timer circuit 64 does not receive a signal from DSP 52 within a predetermined interval of time during operation of controller 50.

A digital-to-analog converter (DAC) 70 is connected to receive digital signals from controller 50 and, more particularly, from FPGA 54 and to produce an analog signal as a function of received digital signals. A successive approximation network 72 is connected to receive the analog signal from DAC 70. The successive approximation network 72 includes an amplifier 74 and a comparator 76. Amplifier 74 amplifies the analog signal from DAC 70 and supplies the analog signal to a first input 78 of comparator 76. Comparator 76 compares the analog signals received at first input 78 and at second input 80 and outputs to FPGA 54 a binary signal indicative of the comparison.

In order to determine a value of a signal received at second input 80, FPGA 54 controls DAC 70 so that first input 78 receives from amplifier 74 a plurality of different analog signals having different potentials that enable FPGA 54 to determine from the binary signal output by comparator 76 the value of the analog signal at second input 80. For example, if second input 80 receives an analog signal having a potential of 7 volts, FPGA 54 operates DAC 70 so that first input 78 receives an analog signal having a potential of 5 volts. In response to the difference between the potentials of the analog signals received on first input 78 and second input 80, comparator 76 outputs a digital signal which indicates that the potential of the analog signal at second input 80 is greater than the potential of the analog signal at first input 78. In response, FPGA 54 operates DAC 70 so that first input 78 receives an analog signal having a potential of 7.5 volts. In response to detecting the potential of the signal at the first input 78 is greater than the potential of the signal at second input 80, comparator 76 changes binary state. In response to this change of binary state, FPGA 54 determines that the potential at second input 80 is between 5 volts and 7.5 volts. Next, FPGA 54 operates DAC 70 so that first input 78 receives an analog signal having a potential of 6.25 volts. In response to receiving this analog signal, the output of comparator 76 changes state, thereby providing an indication to FPGA 54 that the potential of the analog signal at second input 80 is between 6.25 and 7.50 volts. FPGA 54 continues changing the potential of the analog signal at first input 78 as a function of the binary signal output by comparator 76 until the potential of the analog signal at second input 80 is determined, or approximated, within a desired degree of accuracy. FPGA 54 then conveys the determined or approximated potential of the analog signal at first input 78 to DSP 52.

A transmit/receive (T/R) switch network 90 is connected between the output of amplifier 74 and second input 80 of comparator 76. T/R switch network 90 includes a transmit switch network 92 and a receive switch network 94. T/R switch network 90 is configured to selectively connect the output of amplifier 74 to a tip-out (TO) signal path 96 or a ring-out (RO) signal path 98. TO signal path 96 and RO signal path 98 include a transmit channel filter 100 for low pass filtering analog signals thereon.

An I/O switch network 108 is connected to a side of transmit channel filter 100 opposite T/R switch network 90. I/O switch network 108 includes a tip I/O switch network 110 and a ring I/O switch network 112 connected to an end of TO signal path 96 and RO signal path 98, respectively, opposite T/R switch network 90.

A voiceband transceiver 116 is connected to receive digital signals from controller 50 and, more particularly, from FPGA 54, and to supply as a function of the received digital signals, voiceband signals to a voiceband hybrid 117 which selectively routes the voiceband signals, preferably differential voiceband signals, from FPGA 54 to a voiceband tip path 118 and a voiceband ring path 120. Ends of voiceband tip path 118 and voiceband ring path 120 opposite voiceband hybrid 117 are connected to tip I/O switch network 110 and ring I/O switch network 112, respectively. Tip I/O switch network 110 is configured to selectively connect voiceband tip path 118 and TO signal path 96 to an input of a high voltage amplifier 124, or tip I/O switch network 110 can just connect TO signal path 96 to the input of high voltage amplifier 124. Similarly, ring I/O switch network 112 is configured to selectively connect voiceband ring path 120 and RO signal path 98 to an input of high voltage amplifier 124, or ring I/O switch network 112 can just connect RO signal path 98 to the input of the high voltage amplifier 124.

High voltage amplifier 124 is connected between I/O switch network 108 and I/O 36 of LTU 34. I/O 36 includes a tip terminal 134 and a ring terminal 136 connected to high voltage amplifier 124 via an I/O switch 142. High voltage amplifier 124 includes a tip high voltage amplifier 138 between tip I/O switch network lo and tip terminal 134 and a ring high voltage amplifier 140 between ring I/O switch network 112 and ring terminal 136. Tip high voltage amplifier 138 and ring high voltage amplifier 140 have the same circuit topology. Accordingly, the following description of tip high voltage amplifier 138 is applicable to ring high voltage amplifier 140.

Tip high voltage amplifier 138 includes operational amplifier (OP-AMP) 144 having a first input 146 which is connectable by tip I/O switch network 110 to voiceband tip path 118 and TO signal path 96, or just TO signal path 96. A gain stage amplifier 150 is connected to receive signals output by OP-AMP 144. Gain stage amplifier 150 amplifies the signals output by OP-AMP 144 and provides the amplified signals to tip terminal 134 via a current sense resistor 152 and I/O switch 142. The output of gain stage amplifier 150 is connected to a second input 148 of OP-AMP 144 via a resistor divider network 156. Tip high voltage amplifier 138 includes an operational amplifier (OP-AMP) 160 having a first input 162 connected to tip terminal 134 via a resistor divider network 168 and a second input 164. OP-AMP 160 has an output connected to first input 146 of OP-AMP 144 via a summing resistor 170. OP-AMP 144 and resistor divider network 156 coact to operate as an automatic gain control to limit the gain of gain stage amplifier 150. OP-AMP 160 and resistor divider network 168 coact to operate as an automatic impedance synthesizer for the output impedance at tip terminal 134.

Figure 6:
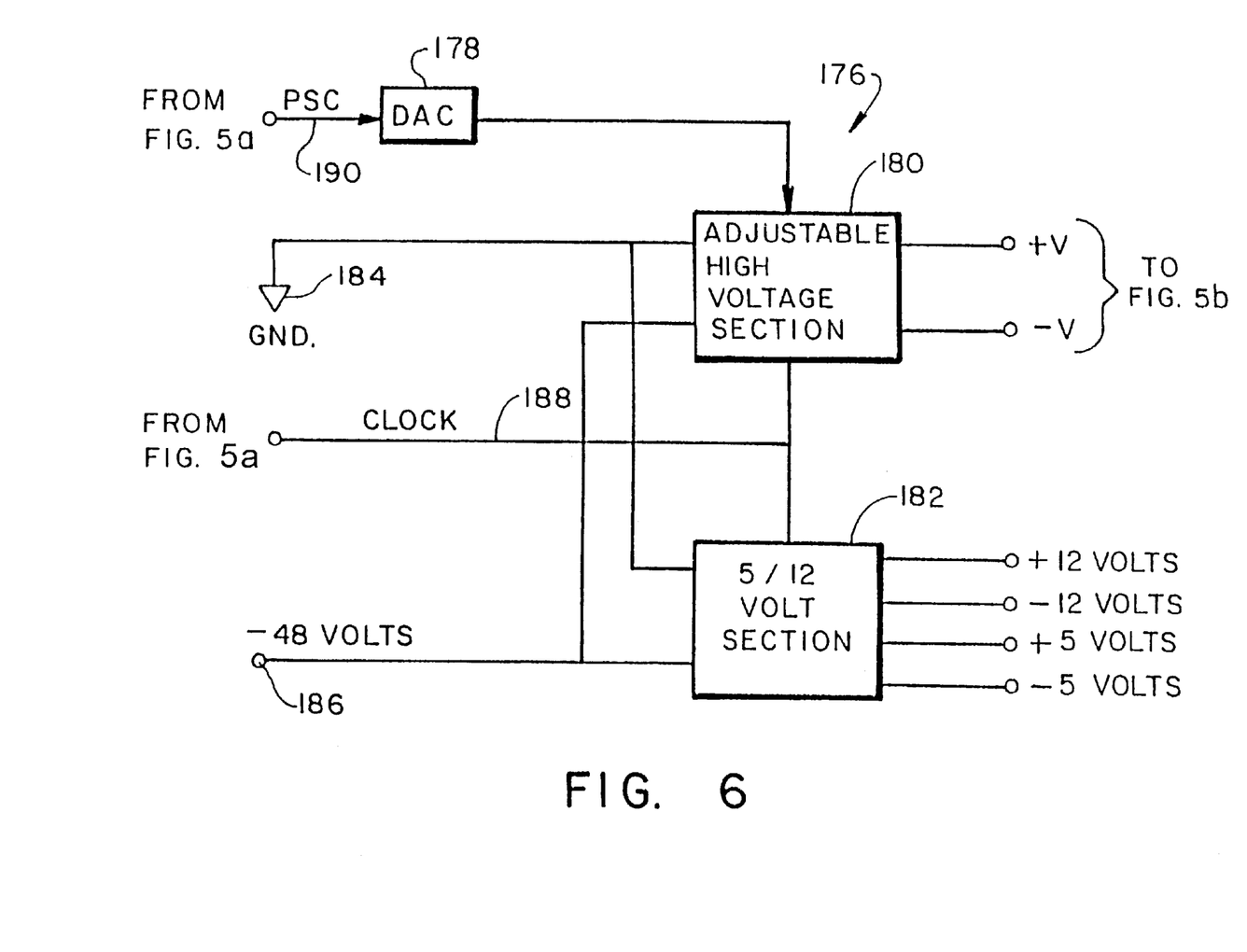
FIG. 6 is a schematic drawing of a power supply of the line test unit shown in FIGS. 3 and 4.

With reference to FIG. 6, and with continuing reference to FIGS. 5a and 5b, LTU 34 includes a power supply 176 having a digital-to-analog converter (DAC) 178, an adjustable high voltage section 180 and a fixed 5/12 volt section 182. Adjustable high voltage section 180 and 5/12 volt section 182 are connected to receive ground 184 and −48 volts 186 from an external power supply (not shown) of DLC remote terminal 16. Adjustable high voltage section 180 and 5/12 volt section 182 are also connected to receive a clock signal 188 from FPGA 54. DAC 178 is connected to receive a power supply control (PSC) signal 190 from FPGA 54. In response to receiving PSC signal 190, DAC 178 supplies to adjustable high voltage section 180 a corresponding analog signal. Preferably, adjustable high voltage section 180 outputs to the gain stage amplifiers 150 the differential voltage ±V having a maximum value of ±190 volts. The 5/12 volt section 182 outputs differential voltages ±5 volts and ±12 volts that are utilized by the various components of LTU 34.

Referring back to FIGS. 5a and 5b, the output of OP-AMP 160 is also connected in a feedback node to second input 164 thereof and to receive switch network 94 via a tip-in (TI) signal path 194. A tip I/O signal path 196 is connected between tip terminal 134 and a sample-and-hold switch network 198. In a similar manner, a ring-in (RI) signal path 204 and a ring I/O signal path 206 are connected from ring high voltage amplifier 140 to receive switch network 94 and sample-and-hold switch network 198, respectively. TI signal path 194 and RI signal path 204 include a receive channel filter 212 for low pass filtering analog signals thereon.

Sample-and-hold switch network 198 is configured to selectively connect tip I/O signal path 196 or ring I/O signal path 206 to second input 80 of comparator 76. Ring I/O signal path 206 is also connected to a comparator 208 having an output connected to FPGA 54. Comparator 208 is utilized to buffer communication signals received thereby via ring I/O signal path 206 from ring terminal 136 during remote programming of memory 62.

Voiceband hybrid 117 is connected to receive voiceband signals on TI signal path 194 and RI signal path 204. Voiceband hybrid 117 routes voiceband signals received from TI signal path 194 and RI signal path 204 to voiceband transceiver 116 which converts the received voiceband signals into digital signals for use by FPGA 54.

In order to test select customer telephony equipment 6, test controller 32 supplies an electrical test request signal to DLC central office terminal 14 which converts the electrical test request signal into an optical test request signal which is transmitted to DLC remote terminal 16 via fiber optic cable 18. In response to receiving the optical test request signal, DLC remote terminal 16 converts the optical test request signal back into the electrical test request signal for processing thereby. In response to receiving the electrical test request signal, DLC remote terminal 16 connects tip terminal 134 and ring terminal 136 to a tip circuit and a ring circuit of a select customer telephony equipment 6 and supplies the electrical test request signal to the communication hardware thereof for conversion into the serial communication signals which are supplied to the communication interface, i.e., SPI 56, UART 58 or CUI 60, of controller 50. In response to receiving the serial communication signals, DSP 52, operating in accordance with the software program stored in memory 62, causes DC and/or AC test signals to be supplied to tip terminal 134 and/or ring terminal 136 and measures the response of the select customer telephony equipment 6 to such test signals.

In order to determine whether OP-AMP 160 of tip high voltage amplifier 138 and/or ring high voltage amplifier 140 and/or receive channel filter 212 impairs the measurement of voltage at tip terminal 134 and/or ring terminal 136, the software program stored in memory 62 causes DSP 52 to instruct FPGA 54 to perform a closed loop signal test of signals output through transmit channel filter 100 and received through receive channel filter 212. Specifically, FPGA 54 causes I/O switch 142 to isolate tip terminal 134 and ring terminal 136 from high voltage amplifier 124 and causes I/O switch network 108 to connect TO signal path 96 and RO signal path 98 to the inputs of tip high voltage amplifier 138 and ring high voltage amplifier 140, respectively. Next, FPGA 54 operates transmit switch network 92 to sequentially connect TO signal path 96 and RO signal path 98 to the output of amplifier 74. FPGA 54 also controls DAC 70 to cause amplifier 74 to output a 0 volt DC test signal to TO signal path 96 and RO signal path 98. In response to receiving the 0 volt DC test signal on TO signal path 96, tip high voltage amplifier 138 amplifies the 0 volt DC test signal and supplies the amplified 0 volt DC test signal to TI signal path 194 and tip I/O signal path 196. Similarly, in response to receiving the 0 volt DC test signal on RO signal path 98, ring high voltage amplifier 140 amplifies the 0 volt DC test signal and supplies the amplified 0 volt DC test signal to RI signal path 204 and ring I/O signal path 206. Simultaneous with the sequential supply of the 0 volt DC test signal to TO signal path 96 and RO signal path 98, FPGA 54 operates receive switch network 94 to sequentially connect TI signal path 194, RI signal path 204, tip I/O signal path 196 and ring I/O signal path 206 to successive approximation network 72. Receive switch network 94 includes one or more capacitors 214 connectable to TI signal path 194, RI signal path 204, tip I/O signal path 196 and ring I/O signal path 206 to sample and hold the potential of the signals received thereon during the sequential connecting of the successive approximation network 72 thereto. The one or more capacitors 214 enable the outputs of tip high voltage amplifier 138 and ring high voltage amplifier 140 to be measured in the absence of test signals, e.g., the 0 volt DC test signal, to the inputs thereof. Preferably, a 0 volt signal output by tip high voltage amplifier 138 and ring high voltage amplifier 140 results in second input 80 of comparator 76 receiving 0 volts on TI signal path 194, RI signal path 204, tip I/O signal path 194 and ring I/O signal path 206. Any differences between the voltage received at second input 80 of comparator 76 from TI signal path 194 and tip I/O signal path 196, or RI signal path 204 and ring I/O signal path 206 are stored by DSP 52 in memory 62 to adjust for the effect of one or more of OP-AMP 160 and/or receive channel filter 212 on the measurement of voltage at the tip terminal 134 or ring terminal 136.

Next, DSP 52 causes tip high voltage amplifier 138 and ring high voltage amplifier 140 to output a 50 volt DC test signal and causes successive approximation network 72 to successively measure at second input 80 of comparator 76 the voltage on TI signal path 194, RI signal path 204, tip I/O signal path 196 and ring I/O signal path 206. Preferably, the 50 volt DC test signal output by tip high voltage amplifier 138 and ring high voltage amplifier 140 results in second input 80 of comparator 76 measuring on TI signal path 194, RI signal path 204, tip I/O signal path 196 and ring I/O signal path 206 a DC test voltage adjusted for the voltage drop across resistor divider network 168. Any differences between the adjusted DC test voltage measured on TI signal path 194 and tip I/O signal path 196, or RI signal path 204 and ring I/O signal path 206 are stored by DSP 52 in memory 62 to adjust for the effect of OP-AMP 160 and/or received channel filter 212 on the measurement of voltage at the tip terminal 134 or ring terminal 136.

In order to test customer telephony equipment 6 connected to I/O 36, DSP 52 causes T/R switch network 90 to isolate the output of amplifier 74 from transmit channel filter 100 and to successively connect second input 80 of comparator 76 to TI signal path 194 and RI signal path 204. DSP 52 operates FPGA 54 and DAC 70 to successively approximate the voltage received at second input 80 of comparator 76 from TI signal path 194 and RI signal path 204. If DSP 52 detects the presence of a hazardous voltage on TI signal path 194 or RI signal path 204, DSP 52 terminates testing of customer telephony equipment 6 connected to I/O 36. Absent hazardous voltage, however, DSP 52 causes T/R switch network 90 and I/O switch network 108 to successively connect inputs of tip high voltage amplifier 138 and ring high voltage amplifier 140 to receive DC and/or AC test signals from amplifier 74 via TO signal path 96 and RO signal path 98, respectively. In response to receiving the DC and/or AC test signals, tip high voltage amplifier 138 and ring high voltage amplifier 140 output on tip terminal 134 and ring terminal 136, respectively, amplified DC and/or AC test signals.

Simultaneously, DSP 52 causes T/R switch network 90 to successively connect second input 80 of comparator 76 to TI signal path 194 and RI signal path 204 to measure the response of the tip circuit and the ring circuit of the customer telephony equipment 6 to the amplified DC and/or AC test signals supplied thereto from tip high voltage amplifier 138 and ring high voltage amplifier 140, respectively.

In order to avoid gain stage amplifier 150 of tip high voltage amplifier 138 or ring high voltage amplifier 140 from dissipating power in excess of a desired maximum power dissipation, the software program periodically causes DSP 52 to numerically determine the power dissipated by each gain stage amplifier 150. If DSP 52 determines the power dissipated by one or both of gain stage amplifiers 150 exceeds the desired maximum power dissipation, DSP 52 supplies to DAC 178 of power supply 176 a PSC signal 190 which causes DAC 178 to supply to adjustable high voltage section 180 an analog signal. The analog signal received from DAC 178 causes adjustable high voltage section 180 to output a differential voltage ±V that avoids each gain stage amplifier 150 from dissipating power in excess of the desired maximum power dissipation. More specifically, DSP 52 initially causes adjustable high voltage section 180 to output a desired differential voltage ±V for the desired DC and/or AC test of customer telephony equipment 6. If DSP 52 numerically determines that the power dissipated by one or both of the gain stage amplifiers 150 during such DC and/or AC test exceeds the desired maximum power dissipation, DSP 52 causes adjustable high voltage section 180 to decrease the differential voltage ±V output thereby.

Thereafter, DSP 52 numerically determines if the power dissipated by one or more of the gain stage amplifiers 150 exceeds the desired maximum power dissipation. If so, DSP 52 causes adjustable high voltage section 180 to further reduce the differential voltage ±V supplied to each gain stage amplifier 150. In contrast, if DSP 52 determines that the power dissipated by each gain stage amplifier 150 does not exceed the desired maximum power dissipation, DSP 52 causes adjustable high voltage section 180 to maintain the differential voltage ±V at its current potential.

Examples of amplified DC and AC test signals supplied to the customer telephony equipment 6 include successively applying +50 volts DC to the tip circuit and the ring circuit; successively applying −50 volts DC to the tip circuit and the ring circuit; applying +50 volts DC to the tip circuit and 0 volts DC or ground reference to the ring circuit; and sequentially applying to the tip circuit and ring circuit AC waveforms having frequencies between 10 Hz and 200 Hz and peak values of ±50 volts AC. Concurrent with supplying one or more of the foregoing DC and/or AC test signals to the tip circuit and ring circuit, the LTU 34 successively measures the response of the tip circuit and the ring circuit to such AC and DC test signals via the TI signal path 194 and the RI signal path 204. Preferably, DSP 52 causes T/R switch network 90 to successively connect each of the TO signal path 96, RO signal path 98, TI signal path 194 and RI signal path 204 to the successive approximation network 72 four thousand (4,000) times per second. It is to be appreciated, however, that the exact order of connecting TO signal path 96, RO signal path 98, TI signal path 194 and RI signal path 204 to the successive approximation network 72 can be varied as well as the number of times each such signal path is connected to the successive approximation network 72 in a given interval of time.

The software program stored in memory 62 includes code that enables DSP 52 to analyze and characterize signals received at second input 80 of comparator 76 from TI signal path 194 and RI signal path 204. DSP 52 can convert the characterization of the signal received at second input 80 of comparator 76 into an electrical test result signal which the DSP 52 can transmit to the DLC remote terminal 16 via the communication interface.

DSP 52 can also cause I/O switch network 108 to connect voiceband tip path 118 and voiceband ring path 120 to tip high voltage amplifier 138 and ring high voltage amplifier 140, respectively. Thereafter, DSP 52 controls FPGA 54 and voiceband transceiver 116 to supply to voiceband tip path 118 and voiceband ring path 120 a differential voiceband signal which is combined with DC test signals, i.e., bias signals, sequentially received via TO signal path 96 and RO signal path 98, respectively, from amplifier 74. The combined voiceband and DC test signals are supplied to tip high voltage amplifier 138 and ring high voltage amplifier 140 for amplification and the supply thereof to tip terminal 134 and ring terminal 136, respectively.

Voiceband signals received at tip terminal 134 or ring terminal 136 from customer telephony equipment 6 are amplified by OP-AMP 160 and supplied to TI signal path 194 and RI signal path 204, respectively. Voiceband transceiver 116 receives the voiceband signals on TI signal path 194 and RI signal path 204 via voiceband hybrid 117 and converts the received voiceband signals into corresponding digital signals usable by FPGA 54. DSP 52 characterizes the digital signals received by FPGA 54 from voiceband transceiver 116 and converts the received digital signals into an electrical test result signal which the DSP 52 can transmit to the DLC remote terminal 16 via the communication interface.

As can be seen, LTU 34 enables customer telephony equipment 6 to be tested utilizing combination voiceband and DC test signals, DC test signals and/or AC test signals. LTU 34 can also receive voiceband signals originating from customer telephony equipment 6 and can measure the response of customer telephony equipment 6 to DC and/or AC test signals output by LTU 34.

The present invention is a low cost and flexible tester which can be positioned at an end of a digital network adjacent customer telephony equipment 6 and which can be utilized to test customer telephony equipment 6 in a manner similar to larger and more expensive test equipment 8 positioned on an end of DLC 12 opposite the customer telephony equipment 6. The present invention avoids the need to run a copper bypass pair parallel to DLC 12 while providing a majority of the testing capability heretofore realized only by test equipment 8 located on the switch side of a telephone system 2.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. A telephony test system for testing customer telephony equipment, the telephony test system comprising: a test control computer configured to supply an electrical test request signal and to receive an electrical test result signal;

a central office terminal between the test control computer and a fiber optic cable, the central office terminal configured to receive the electrical test request signal from the test control computer, to convert the electrical test request signal to a corresponding optical test request signal, to supply the optical test request signal to the fiber optic cable, to receive an optical test result signal from the fiber optic cable, to convert the optical test result signal to the electrical test result signal and to supply the electrical test result signal to the test control computer;

a remote terminal between an end of the fiber optic cable opposite the central office terminal and telephony equipment of a plurality of customers, the remote terminal configured to receive the optical test request signal from the fiber optic cable, to convert the optical test request signal to the electrical test request signal, to receive the electrical test result signal, to convert the electrical test result signal to the optical test result signal and to supply the optical test result signal to the fiber optic cable; and a line test unit (LTU) having a controller between the remote terminal and a high voltage amplifier configured to be connected by the remote terminal to select customer telephony equipment to supply a test signal thereto, the LTU including a power supply configured to be controlled by the controller to supply electrical power to the high voltage amplifier, wherein the controller:

causes the high voltage amplifier to supply a test signal to the customer telephony equipment; and determines electrical power dissipated by the high voltage amplifier supplying the test signal to the customer telephony equipment and controls the power supply to adjust the voltage supplied to the high voltage amplifier to avoid electrical power dissipated by the high voltage amplifier from exceeding a desired maximum electrical power dissipation.

2. The telephony test system as set forth in claim 1, wherein the power supply supplies to the high voltage amplifier a differential voltage having a maximum value of ±190 volts.

3. The telephony test system as set forth in claim 1, wherein the controller includes:
a digital signal processor (DSP) operating under control of a software program; and
a logic circuit controlled by the DSP, with the logic circuit or the DSP implementing a communication interface which receives the electrical test request signal from the remote terminal and which supplies the electrical test result signal to the remote terminal.

4. The telephony test system as set forth in claim 1, wherein the LTU includes:
a digital-to-analog converter (DAC) to receive digital signals from the controller and to produce an analog signal as a function of the received digital signals; and
a successive approximation network to receive the analog signal from the DAC, to compare the analog signal received from the DAC and a measured electrical condition of the select customer telephony equipment and to provide to the controller a binary signal indicative of the comparison;
a receive channel filter to filter the measured electrical condition and supply the filtered and measured electrical condition to the successive approximation network for comparison; and
a sample-and-hold switch network to receive the measured electrical condition and to supply the measured electrical condition to the successive approximation network for comparison, wherein the controller connects the successive approximation network to selectively receive the filtered and measured electrical condition from the receive channel filter and the measured electrical condition from the sample-and-hold switch network.

5. The telephony test system as set forth in claim 4, wherein the LTU includes:
a transmit channel filter to receive and filter the analog signal from the DAC and to supply the filtered analog signal to the high voltage amplifier; and
a transmit/receive (T/R) switch network to selectively connect (i) the transmit channel filter to receive the analog signal from the DAC and (ii) the successive approximation network to receive the filtered and measured electrical condition from the receive channel filter.

6. The telephony test system as set forth in claim 4, wherein the LTU includes:
a voiceband transceiver to receive a digital signal from the controller, to supply to the high voltage amplifier a voiceband signal corresponding to the received digital signal, to receive a voiceband signal from the customer telephony equipment and to convert the received voiceband signal into a digital signal for processing by the controller; and
an input/output (I/O) switch network to connect the high voltage amplifier to selectively receive (i) the voiceband signal from the voiceband transceiver and the analog signal from the DAC and (ii) the analog signal from the DAC.

7. The telephony test system as set forth in claim 6, wherein the LTU includes:
a tip terminal and a ring terminal configured to be connected by the remote terminal to a tip circuit and a ring circuit of the customer telephony equipment;
a tip I/O signal path and a ring I/O signal path between the sample-and-hold switch network and the tip terminal and the ring terminal to convey the measured electrical condition therefrom to the sample-and-hold switch network;
a tip-out (TO) signal path and a ring-out (RO) signal path to selectively receive the analog signal from the DAC, the TO signal path and the RO signal path including the transmit channel filter;
a tip high voltage amplifier between the TO signal path and the tip terminal and a ring high voltage amplifier between the RO signal path and the ring terminal, the tip high voltage amplifier and the ring high voltage amplifier comprising the high voltage amplifier;
a tip-in (TI) signal path between the tip terminal and the successive approximation network and a ring-in (RI) signal path between the ring terminal and the successive approximation network, the TI signal path and the RI signal path including the receive channel filter;
a voiceband tip path and a voiceband ring path between the voiceband transceiver and the TI signal path and the RI signal path, respectively; and
a tip I/O switch network between the TO signal path, the voiceband tip path and the tip high voltage amplifier and a ring I/O switch network between the RO signal path, the voiceband ring path and the ring high voltage amplifier, the tip I/O switch network and the ring I/O switch network comprising the I/O switch network, wherein:
the tip I/O switch network selectively connects the tip high voltage amplifier to (i) the combination voiceband tip path and TO signal path and (ii) the TO signal path; and
the ring I/O switch network selectively connects the ring high voltage amplifier to (i) the voiceband ring path and the RO signal path and (ii) the RO signal path.

8. The telephony test system as set forth in claim 7, wherein the controller controls the sample-and-hold switch network and the T/R switch network to selectively connect the successive approximation network to the TO signal path, the RO signal path, the TI signal path, the RI signal path, the tip I/O signal path and the ring I/O signal path.

9. A telephony line test unit having a communication interface connected to communicate with a remote terminal which is connected to communicate with a central office terminal via a digital communication network, the telephony line test unit comprising:
an input/output which is selectively connectable by the remote terminal to customer telephony equipment;
a controller which receives an electrical test request signal from the remote terminal;
a digital-to-analog converter (DAC) controlled by the controller to produce an analog signal;
a comparator having a first input, a second input and an output, the first input receiving the analog signal from the DAC, the second input receiving an analog signal from the input/output of the line test unit and the output supplying a binary signal to the controller which corresponds to the comparison of the analog signals received at the first and second inputs;
a high voltage amplifier which selectively receives the analog signal from the DAC and which supplies an electrical test signal to the input/output of the line test unit as a function of the analog signal received thereby; and
an adjustable power supply controlled by the controller to supply to the high voltage amplifier electrical power at a desired potential, wherein:

in response to receiving the electrical test request signal, the controller causes the high voltage amplifier to supply the electrical test signal to the customer telephony equipment;

the controller, the DAC and the comparator coact to determine the response of the customer telephony equipment to the electrical test signal; and the controller determines as a function of the supplied test signal and the response of the customer telephony equipment thereto electrical power dissipated by the high voltage amplifier and controls the power supply to adjust the potential of the electrical power supplied to the high voltage amplifier to avoid electrical power dissipated by the high voltage amplifier from exceeding a desired maximum electrical power dissipation.

10. The telephony line test unit as set forth in claim 9, further including:

a receive channel filter to receive the electrical test signal from the input/output of the line test unit, to filter the received electrical test signal and to supply the filtered electrical test signal to the second input of the comparator; and a switch network to connect the second input of the comparator to selectively receive the electrical test signal from the input/output of the test system and the filtered electrical test signal from the receive channel filter.

11. The telephony line test unit as set forth in claim 10, further including a transmit channel filter to receive the analog signal from the DAC, to filter the received analog signal and to supply the filter analog signal to the high voltage amplifier.

12. The telephony line test unit as set forth in claim 10, further including a voiceband transceiver to supply a voiceband signal to the high voltage amplifier and to receive a voiceband signal from the input/output of the line test unit, wherein the switch network connects the high voltage amplifier to selectively receive (i) the voiceband signal from the voiceband transceiver and the analog signal from the DAC and (ii) the analog signal from the DAC.

13. A method of testing customer telephony equipment connected to a switching network with a test system disposed at the switching network, the method comprising the steps of:

(a) receiving a test request signal at the test system and the switching network;

(b) in response to the switching network receiving the test request signal, connecting an input/output of the test system to the customer telephony equipment;

(c) in response to the test system receiving the test request signal and the switching network connecting the input/output of the test system to the customer telephony equipment, causing a high voltage amplifier of the test system to supply a test voltage to the customer telephony equipment via the input/output of the test system;

(d) determining electrical power dissipated by the high voltage amplifier during supply of the test voltage thereby; and (e) controlling a power supply to adjust a voltage supplied to the high voltage amplifier to avoid electrical power dissipated thereby during supply of the test voltage from exceeding a desired maximum electrical power dissipation.

14. The method as set forth in claim 13, further including the steps of:

(f) measuring with the test system via the input/output thereof a response of the customer telephony equipment to the test voltage; and (g) transmitting from the test system a test result signal related to the measured response of the customer telephony equipment.

15. The method as set forth in claim 14, further including the step of repeating steps (a) through (g) for another customer telephony equipment.

16. The method as set forth in claim 14, further including the step of isolating the input/output of the test system from the customer telephony equipment after step (f).

17. A test system disposed at a switching network for testing telephony equipment of a plurality of customers connected to the switching network, the test system comprising:

receiver means for receiving a test request signal via the switching network; measurement means for measuring electrical conditions of the telephony equipment of one of the plurality of customers;

high voltage amplifier means for supplying a test voltage to the telephony equipment of the one customer;

control means for controlling the high voltage amplifier means to supply the analog test voltage to the telephony equipment of the one customer and for controlling the measurement means to measure an electrical condition of the telephony equipment of the one customer in response to the test voltage;

power supply means controlled by the control means to supply electrical power to the high voltage amplifier means; and transmitting means for transmitting a test result signal related to the measured electrical condition of the telephony equipment of the one customer, wherein:

the control means determines electrical power dissipated by the high voltage amplifier means supplying the test voltage to the telephony equipment of the one customer and controls the power supply means to adjust the voltage supplied to the high voltage amplifier means to avoid electrical power dissipated thereby from exceeding a desired maximum electrical power dissipation.

18. The test system as set forth in claim 17, wherein the test voltage is (i) a combination voiceband signal and DC signal, (ii) a DC signal or (iii) an AC signal.

19. The test system as set forth in claim 17, wherein the measurement means includes:

digital-to-analog converting means for converting digital control signals from the control means to a corresponding analog signal; and comparator means for comparing the analog signal and the electrical condition of the telephony equipment of the one customer and producing a binary signal as a function of the comparison, wherein the control means changes the digital control signals as a function of the state of the binary signal produced by the comparator means whereby the control means determines the potential of the electrical condition of the telephony equipment of the one customer.

* * * * *

UNITED STATES PATENT AND TRADEMARK OFFICE
CERTIFICATE OF CORRECTION

PATENT NO. : 6,522,723 B1
DATED : February 18, 2003
INVENTOR(S) : Gary M. Miller It is certified that error appears in the above-identified patent and that said Letters Patent is hereby corrected as shown below:

<u>Title page,</u>
Item [75], Inventor, "Leesburg, VA" should read -- Kearneysville, WV --.

<u>Column 9,</u>
Line 48, "network lo" should read -- network 110 --.

<u>Column 11,</u>
Lines 10-11, "amplifier 140 and/or" should read -- amplifier 140, and/or --.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,522,723 B1
DATED         : February 18, 2003
INVENTOR(S)   : Gary M. Miller It is certified that error appears in the above-identified patent and that said Letters Patent is hereby corrected as shown below:

<u>Title page,</u>
Item [75], Inventor, "Leesburg, VA" should read -- Kearneysville, WV --.

<u>Column 9,</u>
Line 48, "network lo" should read -- network 110 --.

<u>Column 11,</u>
Lines 10-11, "amplifier 140 and/or" should read -- amplifier 140, and/or --.

Signed and Sealed this

Second Day of September, 2003

JAMES E. ROGAN
*Director of the United States Patent and Trademark Office*